Oct. 26, 1943.　　W. H. BOSWORTH　　2,332,839
MATERIAL HANDLING MACHINE
Filed Jan. 8, 1943　　2 Sheets-Sheet 1
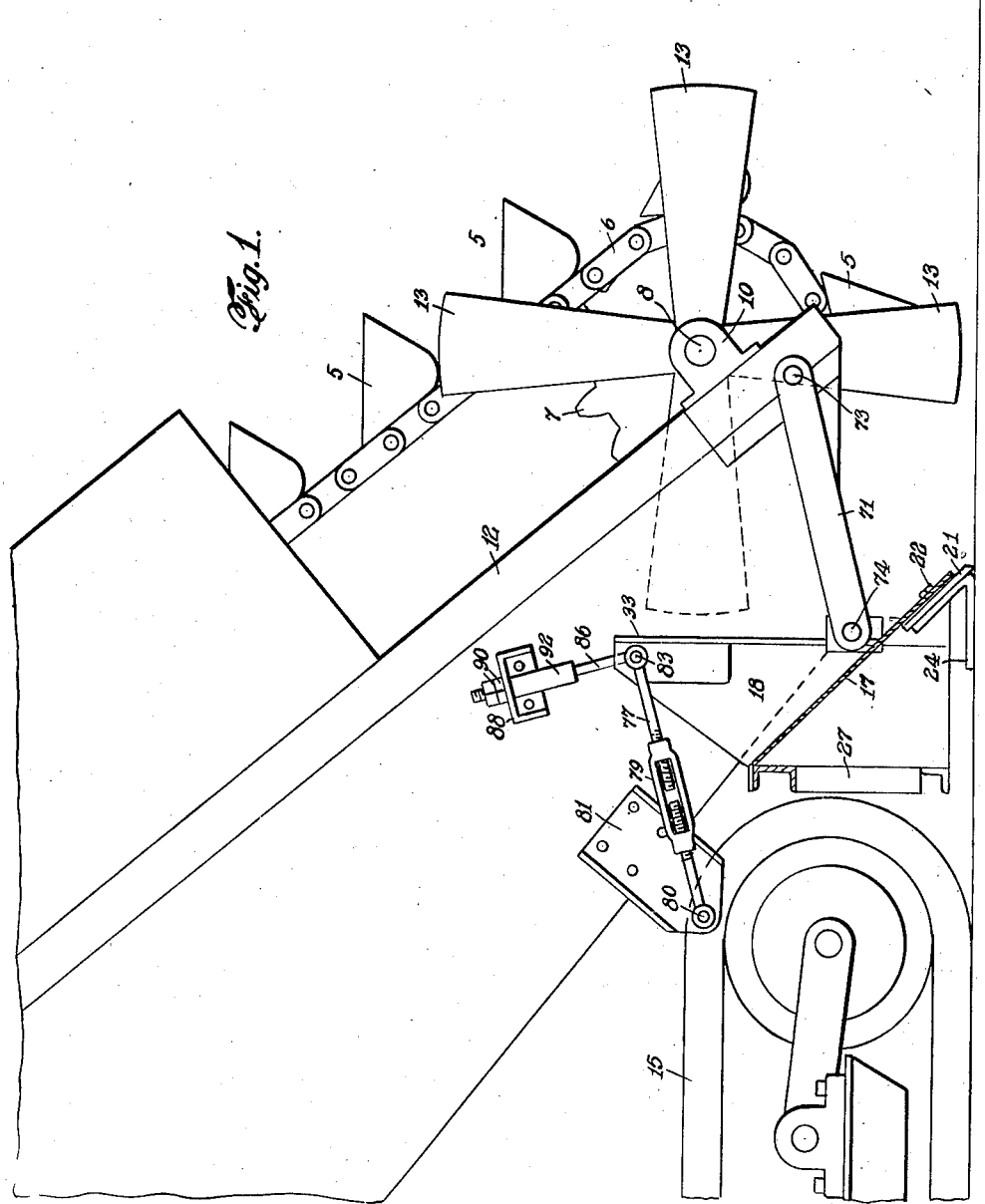
INVENTOR.
William H. Bosworth
BY
Williams, Rich & Morse
ATTORNEYS.

Oct. 26, 1943.  W. H. BOSWORTH  2,332,839
MATERIAL HANDLING MACHINE
Filed Jan. 8, 1943  2 Sheets-Sheet 2
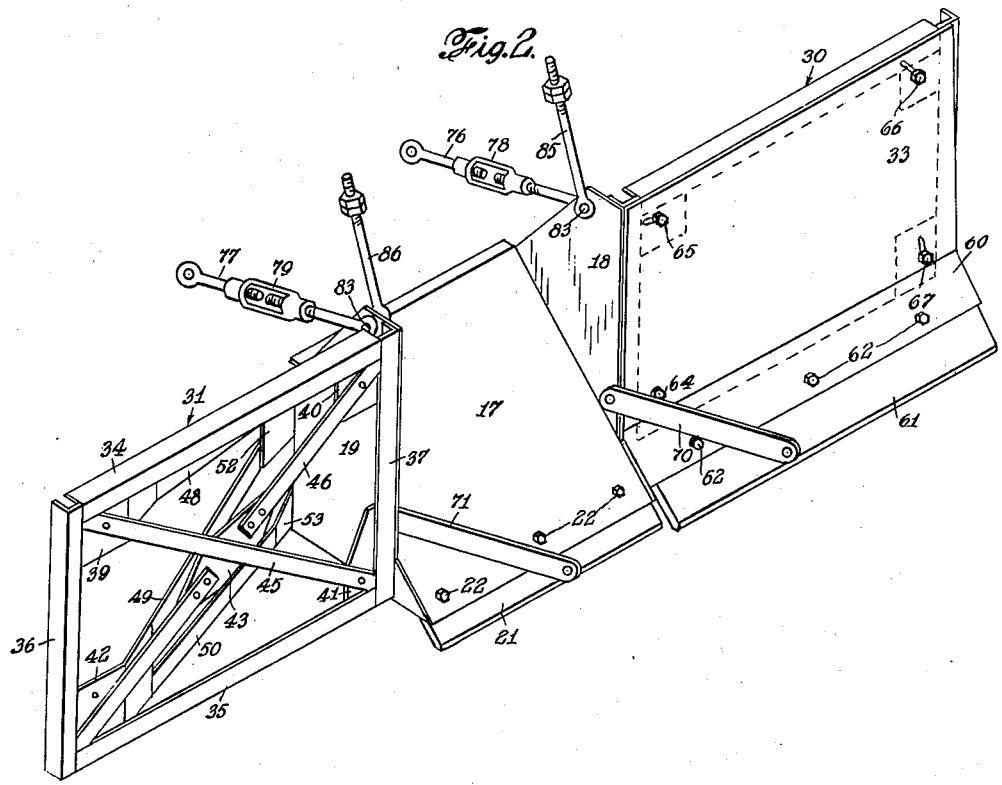
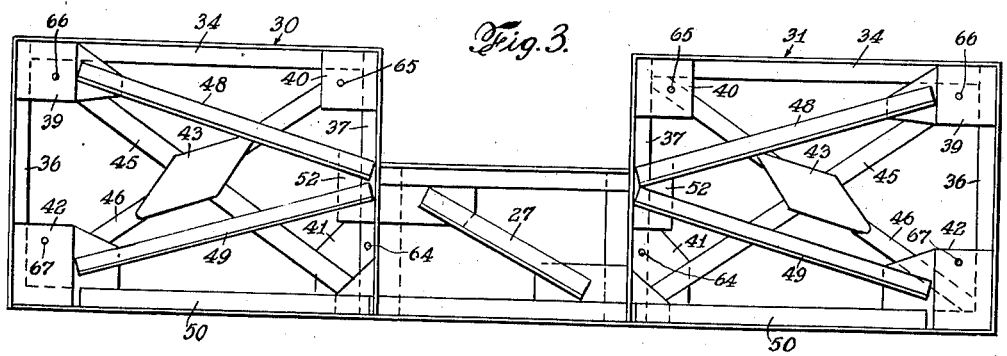
INVENTOR.
William H. Bosworth
BY
Williams, Rich + Morse
ATTORNEYS.

Patented Oct. 26, 1943

2,332,839

UNITED STATES PATENT OFFICE 2,332,839

MATERIAL HANDLING MACHINE

William H. Bosworth, Yonkers, N. Y., assignor to George Haiss Manufacturing Co. Inc., New York, N. Y., a corporation of New York Application January 8, 1943, Serial No. 471,690

4 Claims. (Cl. 198—9)

This invention relates to material handling machines sometimes called wagon loaders although they may be used not only for the loading of wagons and trucks with sand, gravel or other materials, but also for picking up such materials and feeding them to a mixing machine.

The invention is particularly useful in connection with material handling machines of the type employing a pivotally supported bucket elevator to which the material to be handled is fed by a scraper and rotary digging and feeding elements which operate upon the material to be handled as the lower end of the bucket elevator is crowded at slow speed into such material. Such machines are shown, for example, in United States Patents, No. 1,674,329 to Haiss, in which the scraper is attached both to the bucket elevator and to the main frame of the machine; and No. 1,958,460 to Barber, in which the scraper is supported entirely from the main frame of the machine.

The present invention particularly relates to an improved scraper applicable to such material handling machines, and to improved means for supporting the scraper in cooperative relation to the bucket elevator and to the digging and feeding elements. The invention is characterized by a rigid and rugged scraper which is separate from but is adjustably and entirely supported from the pivoted frame of the bucket elevator, rather than wholly or partly from the main frame of the material handling machine as heretofore. This construction and arrangement makes the scraper independent of the main frame of the machine and insures that, when the pivoted frame of the bucket elevator is tilted, the scraper will move with that frame and will maintain substantially the same position with reference to the buckets and to the digging and feeding elements at all times regardless of the position to which the bucket elevator may be tilted. Thus, pivotal movement of the bucket elevator is facilitated, and the bucket elevator remains substantially balanced on its pivot in all positions.

The invention will be understood from the following description of an embodiment thereof as shown in the accompanying drawings in which Fig. 1 is a fragmentary side elevation, partly in section, showing the pick-up end of a material handling machine having the invention embodied therein; Fig. 2 is a perspective view of portions of the scraper and the associated parts by which it is supported; and Fig. 3 is a rear view of the rigid back frame of the scraper. The same parts are referred to throughout the drawings by the same reference characters.

In Fig. 1, the bucket elevator is shown as including buckets 5 in which the material is picked up and carried upward, mounted on two sprocket chains one of which is shown at 6, running on sprocket wheels one of which is shown at 7, carried by a shaft 8 mounted in bearings one of which is shown at 10, supported on the elevator side frames one of which is shown at 12. The shaft 8 carries the usual digging and feeding elements 13, which serve to feed the material to be handled from each side toward the path of the buckets 5. It will be understood that the bucket elevator frame is pivotally mounted on the main frame of the machine, and that the main frame of the machine is supported on a traction mechanism of the endless-track or any other suitable type generally indicated at 15. All of the parts so far described are similar to those shown in the hereinbefore mentioned Patent No. 1,674,329.

Cooperating with the buckets 5 and the digging and feeding elements 13, is a scraper which will now be described together with the means by which it is adjustably supported entirely from the elevator frame. As will hereafter appear, the scraper is not connected to the main frame of the machine, but is held in proper relation to the buckets 5 and the digging and feeding elements 13 by means connected to the bucket elevator frame and to the rigid back-frame of the scraper. The construction of the scraper will be readily understood from Figs. 2 and 3. The rigid back-frame of the scraper has a center scraper plate 17 to each side of which are attached protection plates 18 and 19. It will be understood that this center scraper plate 17 is substantially parallel to the side frames 12 of the bucket elevator, and that the center plate 17 serves, along with the protection plates 18 and 19, to retain in the path of the buckets 5 the material which is fed to the bucket elevator by the rotary digging and feeding elements 13. The bottom of the center scraper plate 17 is provided with a scraper blade 21 suitably attached to the plate 17 by bolts 22. A shoe of bent plate metal, of the form shown at 24 in Fig. 1, is attached to the center scraper blade 21 and is adapted to slide upon the ground when the machine is in operation. It will be noted from Fig. 3 that the center scraper plate 17 is made rigid by a cross brace consisting of an angle iron 27 welded in a diagonal position behind and beneath the scraper plate 17. Secured to and extending outwardly from each of the protection plates 18 and 19, are side frames 30 and 31 which are adapted to support side scraper plates, one of which 33 is shown in Fig. 2. As best shown in Figs. 2 and 3, the side frames 30 and 31 are composed principally of sections of angle iron welded together. The exact construction of the side-frames 30 and 31 can, of course, take many forms, the essential requirement being that these side-frames be themselves rigid and be rigidly secured to the protection plates 18 and 19, so that the back-frame as a whole shall be rigid and capable of resisting without distortion the very considerable strains to which it is subjected during the use of the machine. The structure of the side-frame 31 (and of the similar side-frame 30) will be understood from Figs. 2 and 3 from which it is apparent that each side-frame includes a rectangular frame made up of top and bottom sections 34 and 35 and side sections 36 and 37, to which are welded corner plates 39, 40, 41 and 42. Cross braces 45 and 46 which respectively are welded at their ends to the plates 39 and 41 and to the plates 40 and 42 and centrally to the plate 43, serve to maintain the rectangular shape of the frames 30 and 31. As will be apparent from Figs. 2 and 3, the side-frames 30 and 31 are suitably braced by the bracing members 48, 49 and 50 extending at an angle to the planes of the side frames 30 and 31, from near the outer portion of the latter to the rear edge of the protection plate 18 or 19; that is, the bracing member 48 is secured at one end to the corner plate 39 and at the other end to the plate 52 secured to the protection plate 18 or 19, the bracing member 49 is secured at one end to the corner plate 42 and at the other end to a plate 52 secured to the protection plate 18 or 19, and the bracing member 50 is secured at one end to the corner plate 42 and at the other end to a plate 53 secured to the protection plate 18 or 19. Thus the side-frames 30 and 31 are rigidly secured respectively to the protection plates 19 and 18 which are attached to the center scraper plate 17, and the side frames 30 and 31 lie in the same plane; and a rigid back frame is provided for the scraper. As shown at the right side of Fig. 2, each side scraper plate 33 is provided with a forwardly bent portion 60 carrying a scraper blade 61 which is secured to the scraper plate by the bolts 62 and is provided on its rear side with shoes (not shown) similar to the shoe 24 on the scraper center plate 21. Each side scraper plate 33 is attached in a well known manner, to its side-frame 30 (or 31) by bolts 64, 65, 66 and 67 so as to permit the usual limited pivotal movement on the bolt 64, thereby making it possible for the scraper to pick up material from a crowned road surface.

The means by which the entire scraper structure is supported from the frame of the bucket elevator will now be described. This supporting means is clearly shown in Figs. 1 and 2 from which it will be apparent that the various elements of the supporting means are in two groups and that each group is located on each side of the center scraper plate 17 in planes parallel to and adjacent the protector plates 18 and 19. One pair of elements of the supporting means consists of spacing means or links 70 and 71 the forward ends of which are pivotally connected to the elevator side-frames 12 as shown at 73 in Fig. 1, and at their rearward ends are pivotally connected to the protector plates 18 and 19 and the rigid back frame of the scraper as indicated at 74 in Fig. 1. Another pair of elements forming part of the scraper supporting means are the links 76 and 77 containing turn buckles 78 and 79; the rear ends of which are pivotally connected at 80 to plates 81 secured to the frame of the bucket elevator, and the forward ends of which are pivotally connected at 83 to the protector plates 18 or 19 near their tops. Thus the rigid back frame of the scraper is secured at its top and near its bottom to the conveyor frame 12 by the links 70—71 and 76—77, in such a manner that the scraper plates 33 lie in substantially vertical planes, and slight vertical movement of the whole scraper is permitted. Another pair of elements cooperating with the scraper are the bolts 85 and 86 which at one end are pivotally connected at 83 to the protection plates 18 and 19 and at their other end pass freely through holes in brackets 88 secured to the side frames of the bucket elevator, the upper ends of the bolts 85 and 86 being threaded and provided with nuts 90 permitting adjustment of the effective length of the bolts 85 and 86. Sleeves 92 secured to the brackets 88 surround the threaded ends of the bolts 85 and 86 and protect the threads. It is apparent that by adjusting the nuts 90 the height of the scraper may be controlled; and it will be understood that in practice the nuts 90 are so set that the scraper shoe 24 will just touch the ground. It will also be understood that the sliding fit between the bolts 85 and 86 and the brackets 88 permits the scraper to rise when it passes over a hump in the ground over which the machine is moved.

From the foregoing description it will be apparent that the rigid back frame of the scraper may be tilted forwardly and backwardly by turning the turn-buckles 78 and 79, and may be adjusted as to height and as to slope transversely of the machine by adjusting the nuts 90 on the bolts 85 and 86. It will also be apparent that the scraper is supported in its proper position entirely from the pivoted frame of the bucket elevator, and that when the frame of the bucket elevator is tilted to its inoperative position (when the material handling machine is being moved from one location to another) the entire scraper structure rises with the bucket elevator, and that no disconnecting of any parts is necessary, unlike the arrangement shown in the hereinbefore mentioned Patent No. 1,674,329.

What is claimed is:

1. In a material handling machine, in combination with a bucket elevator including a frame, and rotary digging and feeding elements cooperating with said bucket elevator, a scraper separate from but cooperating with said bucket elevator and with said digging and feeding elements and comprising a rigid back-frame, a center scraper plate rigidly secured thereto, and side scraper plates mounted on said back frame one at each side of said center plate; and means located adjacent the edges of said center scraper plate for adjustably supporting said rigid back-frame entirely from said elevator frame.

2. In a material handling machine, in combination with a bucket elevator including a frame, and rotary digging and feeding elements cooperating with said bucket elevator; a scraper separate from but cooperating with said bucket elevator and with said digging and feeding elements and comprising a rigid back-frame, a center scraper plate rigidly secured thereto, and a side scraper plate mounted on said back frame at each side of said center plate; and means located adjacent the edges of said center scraper plate for adjustably supporting said rigid back-frame entirely from said elevator frame comprising spacing means connecting the bottom and the top of said back-frame to said elevator frame, and adjustable supporting means connecting the top of said back-frame to said elevator frame.

3. In a material handling machine, in combination with a bucket elevator including a frame, and rotary digging and feeding elements cooperating with said bucket elevator; a scraper cooperating with said bucket elevator and with said digging and feeding elements and comprising a rigid back-frame, a center scraper plate rigidly secured thereto, and a side scraper plate mounted on said back frame at each side of said center plate; and means for supporting said rigid back-frame entirely from said elevator frame comprising spacing means pivotally connected to said elevator frame at points ahead of said scraper and to said back-frame near its bottom, spacing means pivotally connected to said elevator frame at points behind said scraper and to said back-frame near its top, and supporting means slidably connected to said elevator frame and pivotally connected to said back-frame.

4. In a material handling machine, in combination with a bucket elevator including a frame, and rotary digging and feeding elements cooperating with said bucket elevator; a scraper cooperating with said bucket elevator and with said digging and feeding elements and comprising a rigid back-frame, a center scraper plate rigidly secured thereto, and a side scraper plate mounted on said back-frame at each side of said center plate; and means for supporting said rigid back-frame entirely from said elevator frame comprising links pivotally connected to said elevator frame near its end at points ahead of said scraper and to said back-frame near its bottom, links pivotally connected to said elevator frame at points behind said scraper and to said back-frame near its top, and bolts slidably connected to said elevator frame at points above said scraper and pivotally connected to said back-frame near its top.

WILLIAM H. BOSWORTH.